M. GOODMAN.
TOY BOOK.
APPLICATION FILED NOV. 22, 1919.
1,346,017.
Patented July 6, 1920.
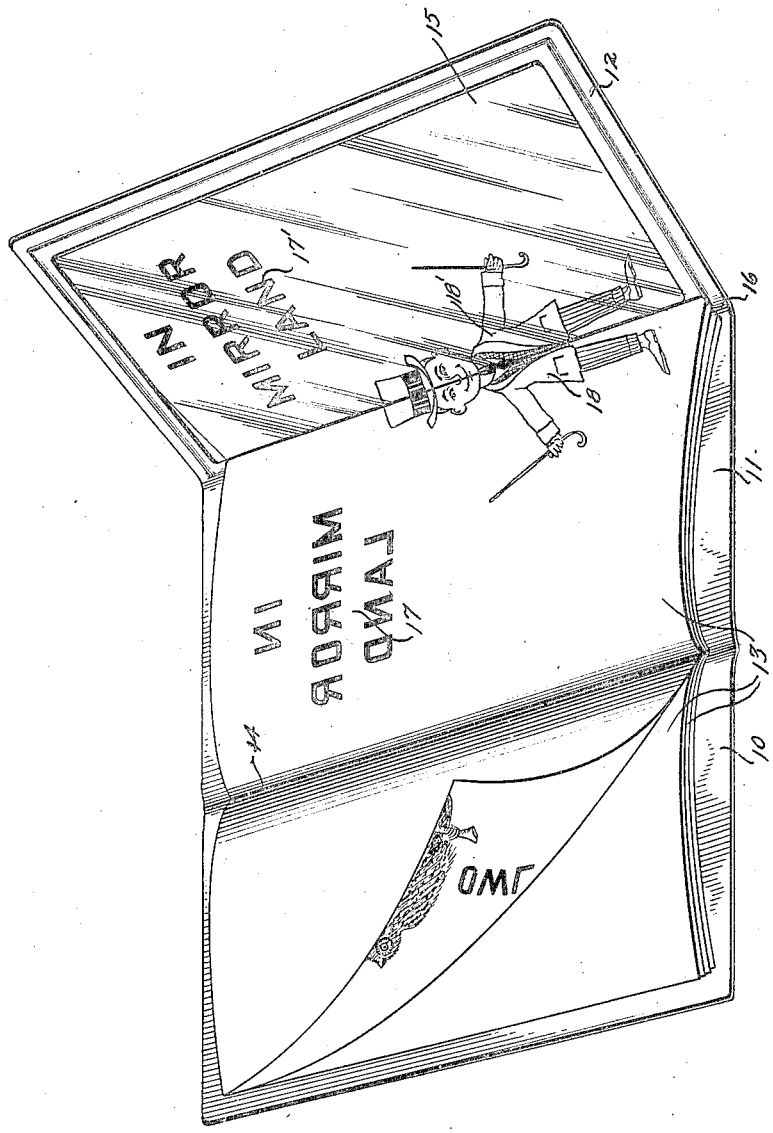

UNITED STATES PATENT OFFICE.

MILTON GOODMAN, OF NEW YORK, N. Y.

TOY BOOK.

1,346,017.     Specification of Letters Patent.     Patented July 6, 1920.

Application filed November 22, 1919. Serial No. 339,774.

*To all whom it may concern:*

Be it known that I, MILTON GOODMAN, a citizen of the United States, and a resident of the city of New York, borough of Manhattan, in the county and State of New York, have invented a new and Improved Toy Book, of which the following is a full, clear, and exact description.

This invention relates to toys and has particular reference to toys of a peculiar educational significance.

Among the objects of the invention is to provide a book or a device having many characteristics of a book including outside parts or covers preferably of a stiff nature and movable inside members such as leaves having unusual or peculiarly arranged legends, figures, cuts, or descriptive matter, means being provided in connection with the book or similar device to make the inscriptions carried by the leaves legible not only directly but also indirectly as by reflection in a mirror.

With reference to printed inscriptions on the book leaves the same may be either positive, similar to ordinary printed or written matter or preferably they are printed or otherwise placed on or worked into the leaves in negative position, in the nature of printers' type, so that a child or other person may become familiar with the reading of negative print just as a printer for example must be able to read a stick of type.

A still further object of the invention is to familiarize a child with the principles of reflection and at the same time afford almost endless amusement because of the wide range of adaptability of subject matter or inscriptions that may be printed or otherwise carried on the leaves of the book.

The foregoing and other objects of the invention will be more fully set forth hereinafter in connection with the specific description of the figure which indicates a perspective view of a book made to cover the essential features of this invention, although it is to be distinctly understood that I do not propose to be limited to any particular size, form or design of the book or any particular type, design or arrangement of subject matter to be carried by the leaves thereof.

Referring now more specifically to the illustration I show my book or like device comprising a cover having a plurality of panels 10, 11 and 12, the panels 10 and 12 being foldable toward each other over the central panel 11.

13 indicates a collection or assemblage of leaves adapted to hinge around or near the hinge line between the panels 10 and 11 as indicated at 14. The panels 10 and 11 and leaf or assemblage of leaves secured therein are very similar in physical make-up to that of an ordinary book in which the leaves are bound between the two back panels.

Carried on or in any other manner connected with any of the panels and in any suitable relation to the inscriptions or subject matter printed or otherwise formed upon the leaves 13 is reflecting means such as a mirror 15 shown in the present instance as carried by the panel 12 and being substantially coextensive with the inner surface thereof, the mirror extending well inward toward the hinge line 16 between the two panels 11 and 12. The back panel 12, for the sake of best protection to the mirror, is made of heavy stiff cardboard, or its equivalent, with the corners well reinforced, assuming that the mirror is made of glass in the usual manner, although metallic or other forms of reflecting means may obviously be employed.

At 17 I indicate a suggestion of negative printed matter carried on the leaves of the book, the character of the type being similar to the character of the face of printers' type, and so the printed matter at 17, or its equivalent, may be read directly only by skill acquired after study and experience such as a type-setter must acquire. If a child for example will hold the mirror panel 12 inward flat against the inner face of the panel 11, the leaves all being first swung over or lifted for this purpose, he may find much amusement and interest as well as cultural training by undertaking to read the negative characters, and with which he will acquire efficiency in a short time if he persists therein. Much amusement therefore as well as cultural advantage is afforded to small children, especially those who have already acquired some familiarity with the art of reading. The mirror however is available by swinging the panel 12 open as indicated, to give to the reader a positive view of the inscription 17, as indicated at 17', in accordance with the principles of optics which are presumed to be generally well understood.

To the child however there is an element of considerable mystery in the fact that the inscription on one side of the line 16 is reverse to that on the other side of the line. This element of mystery consequently lends itself immediately to my scheme of producing on the leaves of the book a series of fairy tales, or other equivalent interesting subject matter, but which obviously *per se* are not any part of this invention.

Another adaptability depicted by the illustration is that of producing on the leaves 13 as indicated at 18, a half figure, the line of cleavage being so arranged as to substantially coincide with the aforesaid line 16 adjacent to the inner edge of the mirror whereby there is produced in the mirror, when held at a favorable angle, an image 18' constituting the counterpart or complement of the positive portion 18, thus producing at least in the mind of the average child a representation of a well known object in complete form. Thus it will be obvious that with the several successive leaves being designed to carry various figures or designs in central section, the mirror will act in succession to complete such figures in a sort of panoramic effect.

I claim:

1. The herein described toy book comprising a plurality of leaves, there being formed adjacent to corresponding edges of said leaves a plurality of representations of half figures, and a mirror carried by the book and extending at one edge in close proximity to said corresponding leaf edges and adapted to be brought successively into correlation with the edges of the leaves bearing said half figures, to disclose in connection with the several half figures the complements thereof.

2. The herein described toy device comprising a member bearing a half representation of a familiar object and a legend descriptive thereof in negative design, and reflecting means so disposed as to complete said representation and display the legend in positive design.

3. The herein described toy book having a stiff back including on its inner surface a mirror and one or more leaves bound in the book and bearing thereon various inscriptions in negative design, which when brought successively into proper correlation with the mirror are legible by reflection in positive design.

4. The herein described toy book comprising a plurality of relatively movable members, one of which bears a half representation of an object and a legend descriptive thereof in negative design, and a mirror carried by another of said movable members and as a permanent part of the book, the mirror being so disposed as to complete said representation and display the legend in positive design.

MILTON GOODMAN.